United States Patent Office 3,357,901
Patented Dec. 12, 1967

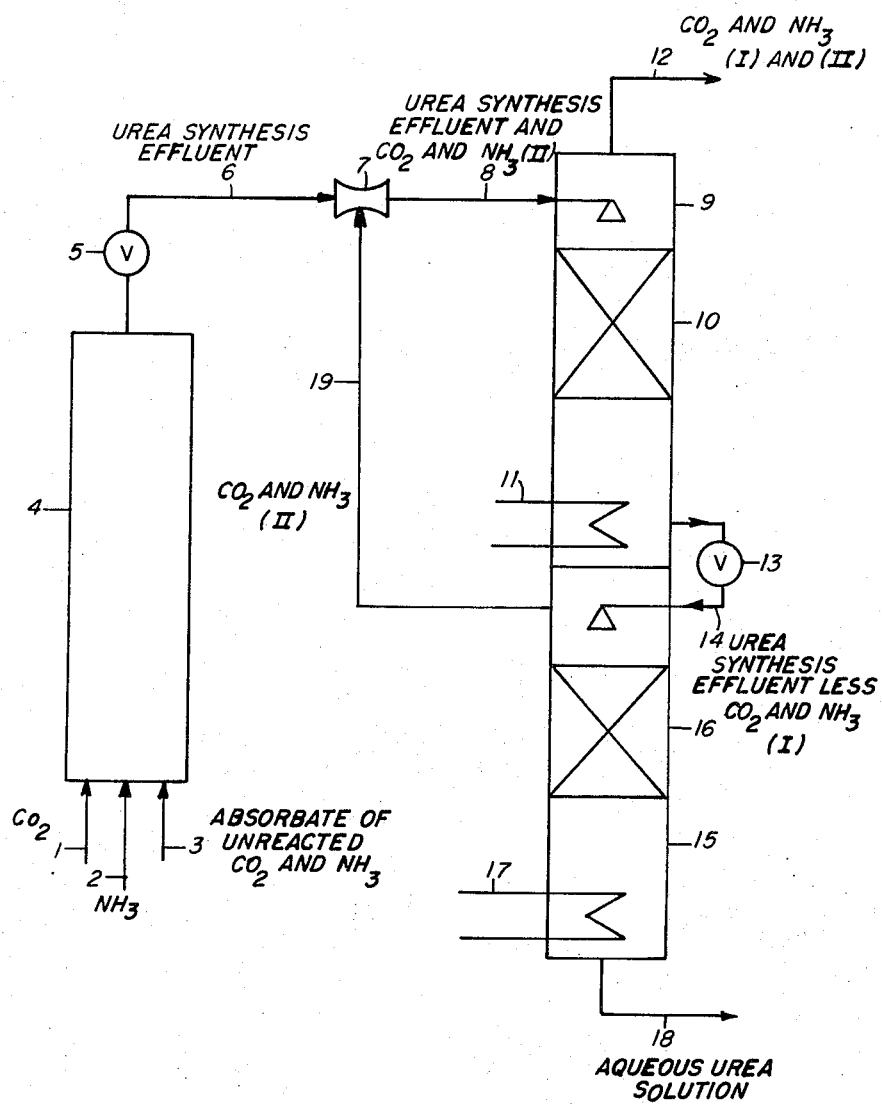

3,357,901
AMMONIA, CARBON DIOXIDE RECOVERY FROM UREA SYNTHESIS UTILIZING AN EJECTOR
Eiji Otsuka and Kazumichi Kanai, Fujisawa, and Shigeru Inoue, Kamakura, Japan, assignors to Toyo Koatsu Industries, Incorporated, Tokyo, Japan, a corporation of Japan
Filed Oct. 11, 1965, Ser. No. 494,736
Claims priority, application Japan, Oct. 16, 1964, 39/58,587
1 Claim. (Cl. 203—78)

ABSTRACT OF THE DISCLOSURE

An improvement in a two stage distillation process for separating unreacted carbon dioxide and ammonia from a urea synthesis wherein the effluent is fed first through a high pressure distillation zone and then through a low pressure distillation zone and gaseous mixtures containing unreacted carbon dioxide and ammonia are removed respectively from said zones, which comprises feeding the effluent through an ejector to reduce the pressure thereof prior to feeding it to the high pressure distillation zone, aspirating the gaseous mixture from the low pressure distillation zone through the ejector to increase the pressure thereof, and feeding the aspirated gaseous mixture with the effluent to the high pressure distillation zone for removal therefrom with the gaseous mixture from the high pressure distillation zone.

---

This invention relates to the treatment of urea synthesis effluents obtained by reacting carbon dioxide and ammonia at elevated temperatures and pressures and, more particularly, to a method of treating the gaseous mixture of unreacted carbon dioxide and ammonia separated by low pressure distillation from the urea synthesis effluent.

The method conventionally used to separate unreacted carbon dioxide and ammonia from the urea synthesis effluent in the urea synthesis process of the solution recycle type consists of two-stage distillations, one under a high pressure and the other under a low pressure. In the conventional separation method, the high pressure distillation is carried out at a gauge pressure of 10 to 30 kg./cm.$^2$ and the low pressure distillation is carried out at a gauge pressure of 0 to 5 kg./cm.$^2$. The gaseous mixtures of unreacted carbon dioxide and ammonia separated from the urea synthesis effluent in the high pressure distillation and the low pressure distillation are absorbed by a suitable absorbent such as water or an aqueous solution of urea under the respective distilling pressures and is recirculated to the urea synthesis.

However, in the conventional separation, since the pressure in the low pressure absorption of the gaseous mixture of unreacted carbon dioxide and ammonia separated in the low pressure distillation is substantially equal to the pressure of the low pressure distillation, the concentration of the carbon dioxide and ammonia in the resulting absorbate is low. If such absorbate is circulated to the urea synthesis, the rate of conversion in the urea synthesis decreases. Therefore, in the urea synthesis process of the solution recycle type, it is desired, in order to improve the rate of conversion, to increase the concentration of carbon dioxide and ammonia in the absorbate and this can be done by compressing the gaseous mixture from the low pressure distillation prior to absorption. For compressing the gaseous mixture from the low pressure distillation, it has been known to compress the gaseous mixture by means of a gas compressor and it has also been known to use a method wherein the pressure of an aqueous solution of ammonium carbonate of such concentration to be in equilibrium with the gaseous mixture is elevated with a pump and then fed to an ejector (jet exhauster) to which the gaseous mixture is also fed, thereby aspirating the gaseous mixture. However, when using the compressor, the operation is difficult and complicated and problems of increased maintenance and increased consumption of electric power are incurred. In the case of using the ejector (jet exhauster), the power to circulate a large amount of the aqueous solution having an elevated pressure will be so large that there is a practical limit on the extent of pressure elevation.

An object of the present invention is to provide an improved method of compressing the gaseous mixture of unreacted carbon dioxide and ammonia separated in low pressure distillation from a urea synthesis effluent.

According to the present invention, the urea synthesis effluent produced by reacting carbon dioxide with ammonia at high temperature and pressure (e.g., 150 to 220° C. at 150 to 400 atmospheres) in a urea synthesis zone is fed to an ejector (jet exhauster) through which the pressure of the effluent is reduced to the pressure suitable for the high pressure distillation operation. After such pressure reduction, the effluent is subjected to a high pressure distillation to separate therefrom a gaseous mixture of a major portion of the unreacted carbon dioxide and ammonia in the effluent. The urea synthesis effluent derived from the high pressure distillation and thereafter having its pressure further reduced is then subjected to a low pressure distillation to separate therefrom a gaseous mixture of the residual portion of unreacted carbon dioxide and ammonia. The gaseous mixture derived from the low pressure distillation is subjected to the aspirating action in the ejector (jet exhauster) whereby the pressure of said gaseous mixture is raised to the pressure of the high pressure distillation.

In the present invention, the separation of unreacted carbon dioxide and ammonia from a urea synthesis effluent is carried out in the two stages of high pressure and low pressure distillations; however, a single gaseous mixture having a pressure equal to the pressure of high pressure distillation is obtained therefrom. That is, practically all of the unreacted carbon dioxide and ammonia in the urea synthesis effluent is separated in the high pressure distillation. The gaseous mixture thus obtained is then absorbed under the pressure of the high pressure distillation in a suitable absorbent such as water, an aqueous solution of ammonia or in aqueous solution of urea in an absorbing column and recycled to the reactor.

The present invention is now explained with reference to the accompanying drawing which diagrammatically shows the process of the present invention. In the drawing, into a urea synthesis autoclave 4 are fed carbon dioxide through pipe 1, ammonia through pipe 2, and through pipe 3 an absorbate obtained by absorbing a gaseous mixture or unreacted carbon dioxide and ammonia separated from urea synthesis effluent. Urea is synthesized therefrom at a temperature of about 170 to 195° C. under a gauge pressure of about 180 to 300 kg./cm.$^2$. The resulting urea synthesis effluent is adjusted to a desirable pressure through a pressure adjusting valve 5 and is fed to an ejector (jet exhauster) 7 through a pipe 6. The pressure of the effluent entering the ejector is approximately 50 to 280 kg./cm.$^2$ less than that existing in the autoclave 4 and the pressure of the effluent after passing through the ejector is approximately that existing in the high pressure column 9. The urea synthesis effluent having the pressure adjusted is jetted out as a jet stream through the nozzle of the ejector (jet exhauster) 7, has the pressure reduced while aspirating a gaseous mixture (II) of unreacted carbon dioxide and ammonia fed to said ejector through a pipe 19 and then is fed to a high pressure distillation column 9 through a conduit pipe 8. The pressure of the gaseous mixture fed to the ejector 7 through pipe 19 is approximately that existing in low pressure column 15 and the pressure of the gaseous mixture leaving ejector 7 is approximately that existing in the high pressure column 9. The high pressure distillation column is internally provided with a packed layer section 10 and a heater 11. Needless to say, the packed layer 10 may be omitted or may be shelves. The high pressure distillation column 9 is operated at a still temperature of about 130 to 160° C. under a gauge pressure of about 10 to 30 kg./cm.$^2$ so that more than about 70 percent of unreacted carbon dioxide and ammonia contained in the urea synthesis effluent is separated.

The urea synthesis effluent having the greater part (I) of the unreacted carbon dioxide and ammonia separated in the high pressure distillation column has its pressure reduced through a valve 13 and is then introduced into a low pressure distillation column 15 through a pipe 14. The low pressure distillation column 15 is of the same structure as of the high pressure distillation column 9 and is provided with a packed layer section 16 and heater 17. Needless to say, the packed layer 16 may be omitted or may be shelves. The low pressure distillation column 15 is operated at a still temperature of about 100 to 140° C. under a gauge pressure of about 0 to 5 kg./cm.$^2$ so that the remaining unreacted carbon dioxide and ammonia in the urea synthesis effluent fed to it is separated as a gaseous mixture. The gaseous mixture (II) is removed through pipe 19 and aspirated by the ejector (jet exhauster) 7, is therein compressed to the high pressure distillation pressure, and is taken out through a pipe 12 together with the unreacted carbon dioxide and ammonia (I) separated in the high pressure distillation column 9. The gaseous mixture from pipe 12 is absorbed in an absorbent such as water, aqueous ammonia solution or an aqueous solution of urea at about the same pressure as the high pressure distillation column 9. The aqueous solution of urea containing very little if any unreacted carbon dioxide and ammonia is taken out through a pipe 18 and is treated by any known method to recover urea.

According to the present invention, by utilizing the energy released in reducing the pressure of the urea synthesis effluent removed from the autoclave to the pressure of the high pressure distillation, the gaseous mixture of the unreacted carbon dioxide and ammonia separated in the low pressure distillation is compressed to the pressure of high pressure distillation and is taken out together with the gaseous mixture of the unreacted carbon dioxide and ammonia separated in the high pressure distillation. Therefore, the amount of absorbent used for the absorption of the gaseous mixture of unreacted carbon dioxide and ammonia is small and a more concentrated absorbate is obtained. Furthermore, in respect to equipment, no low pressure absorbing column is necessary in the present invention as compared with the conventional method of the solution recycle type wherein a urea synthesis effluent is distilled in high pressure and low pressure stages and the resulting gaseous mixtures of unreacted carbon dioxide and ammonia is absorbed in an absorbent at the respective high and low distillation pressures. Therefore, the present invention has highly valuable advantages in that both the costs of the equipment and the operation are low.

*Example*

A urea synthesis effluent consisting of 240 kg./hr. of urea, 310 kg./hr. of $NH_3$, 112 kg./hr. of $CO_2$ and 160 kg./hr. of $H_2O$ at a temperature of 190° C. under a gauge pressure of 250 kg./cm.$^2$ taken out of a urea synthesis autoclave of a urea synthesis plant was fed to an ejector (jet exhauster). This effluent was jetted out through the nozzle of the ejector (jet exhauster) in order to reduce the pressure thereof. At the same time, a gaseous mixture separated from the low pressure distillation column and consisting of 28 kg./hr. of $NH_3$, 11 kg./hr. of $CO_2$ and 30 kg./hr. of $H_2O$ was fed to the ejector and aspirated by the aspirating action of the ejector. The urea synthesis effluent and the gaseous mixture mixed together in the ejector was fed to the top of the high pressure distillation column. The solution flowed down through a packed layer and was heated to 155° C. with a steam heater in the still of the column. The pressure was kept at 17 kg./cm.$^2$ gauge. A gaseous mixture of a composition of 310 kg./hr. of $NH_3$, 112 kg./hr. of $CO_2$ and 30 kg./hr. of $H_2O$ was taken out of the top of the high pressure column.

A solution of a composition of 237 kg./hr. of urea, 30 kg./hr. of $NH_3$, 11 kg./hr. of $CO_2$ and 159 kg./hr. of $H_2O$ was drawn off from the bottom of the high pressure distillation column, had the pressure reduced and was fed to the low pressure distillation column. The pressure in the low pressure distillation column was 1.5 kg./cm.$^2$ and the still temperature was 135° C. Here a gaseous mixture consisting of 28 kg./hr. of $NH_3$, 11 kg./hr. of $CO_2$ and 30 kg./hr. of $H_2O$ was separated and was fed to the ejector where it was aspirated as described above. An aqueous solution of urea of 234 kg./hr. of urea, 3 kg./hr. of $NH_3$, 4 kg./hr. of $CO_2$ and 128 kg./hr. of $H_2O$ was drawn off from the still of the low pressure distillation column and urea was recovered therefrom.

Ejectors (jet exhausters) are well known and any suitable type can be employed. Reference, for example, is made to Chemical Engineers' Handbook, 3rd Edition, John H. Perry, Editor, published by McGraw-Hill Book Company, Inc., New York, 1950, where at page 1453 there is shown a steam jet ejector which, without the venturi shown, can be employed wherein, of course, steam is replaced with the effluent. Any other suitable ejector can be used.

What is claimed is:

In a two stage distillation process for separating unreacted carbon dioxide and ammonia from the effluent containing same and urea from a urea synthesis wherein said effluent is fed through a high pressure distillation zone and thence through a low pressure distillation zone, and gaseous mixtures containing unreacted carbon dioxide and ammonia are removed respectively from said high pressure distillation zone and said low pressure distillation zone, that improvement comprising, feeding said effluent through an ejector to reduce the pressure thereof prior to feeding it to said high pressure distillation zone, aspirating in said ejector said gaseous mixture from said low pressure distillation zone to increase the pressure of said gaseous mixture and feed same with said effluent to said high pressure distillation zone for removal with said gaseous mixture from said high pressure distillation zone.

References Cited

UNITED STATES PATENTS

| | | | |
|---|---|---|---|
| 3,038,285 | 6/1962 | Mavrovic | 260—555 X |
| 3,147,304 | 9/1964 | Gilbert et al. | 260—555 |
| 3,172,911 | 3/1965 | Mavrovic | 260—555 |
| 3,200,148 | 8/1965 | Cook et al. | 260—555 |
| 3,232,985 | 2/1966 | Cook et al. | 260—555 |

FOREIGN PATENTS 594,818    6/1959    Italy.

NORMAN YUDKOFF, *Primary Examiner.*

D. EDWARDS, *Assistant Examiner.*